United States Patent [19]

Ishikawa

[11] Patent Number: 5,162,640
[45] Date of Patent: Nov. 10, 1992

[54] PEN TYPE OPTICAL READING DEVICE HAVING PLURAL LENS ARRANGEMENT

[75] Inventor: Hiroshi Ishikawa, Furukawa, Japan

[73] Assignee: Alps Electric Co., Ltd., Tokyo, Japan

[21] Appl. No.: 642,628

[22] Filed: Jan. 17, 1991

[30] Foreign Application Priority Data

| Feb. 14, 1990 | [JP] | Japan | 2-12737 |
| Feb. 14, 1990 | [JP] | Japan | 2-12738 |
| Feb. 14, 1990 | [JP] | Japan | 2-12739 |
| Feb. 14, 1990 | [JP] | Japan | 2-12742 |
| Feb. 14, 1990 | [JP] | Japan | 2-12743 |
| Feb. 14, 1990 | [JP] | Japan | 2-12744 |
| Feb. 14, 1990 | [JP] | Japan | 2-12745 |

[51] Int. Cl.$^5$ .............................................. G06K 7/10
[52] U.S. Cl. ......................................................... 235/472
[58] Field of Search ........................ 235/462, 472, 467; 250/227.13, 555

[56] References Cited

U.S. PATENT DOCUMENTS

| 3,334,236 | 8/1967 | Bacon | 235/472 X |
| 3,904,277 | 9/1975 | Phillips et al. | 235/472 X |
| 3,911,270 | 10/1975 | Traub | 250/227 |
| 3,920,959 | 11/1975 | Wefers et al. | 235/472 |
| 3,937,558 | 2/1976 | Mukai et al. | 235/472 X |
| 3,949,195 | 4/1976 | Wefers et al. | 235/472 X |
| 4,031,358 | 6/1977 | Thorniley | 235/472 |
| 4,475,153 | 10/1984 | Kihara et al. | 364/145 |
| 4,575,627 | 3/1986 | Pease et al. | 250/227 |
| 4,698,490 | 10/1987 | Nakase et al. | 235/472 |
| 4,748,319 | 5/1988 | Sasaki et al. | 235/472 |
| 4,855,582 | 8/1989 | Bayley | 235/472 |

FOREIGN PATENT DOCUMENTS

| 59-060569 | 4/1984 | Japan | 235/472 |
| 1441137 | 6/1976 | United Kingdom | 235/472 |
| 83/02849 | 8/1983 | World Int. Prop. O. | 235/472 |

*Primary Examiner*—Stuart S. Levy
*Assistant Examiner*—Edward H. Sikorski
*Attorney, Agent, or Firm*—Guy W. Shoup; David W. Heid

[57] ABSTRACT

A hand-held optical reading device which is gripped by an operator's hand to scan and read bar codes optically indicated on a medium. The device comprises an outer case shaped into the tubular form and having an opening formed in the circumferential surface thereof and an end opening formed at the end face thereof, light emitting and receiving elements accommodated in the outer case for detecting information optically recorded on the medium, a push-button switch for instructing to start a detection operation of the light emitting and receiving elements, an operating button having an operating portion accommodated in the opening to be capable of being depressed inwardly through the opening to transmit a depressing force to the push-button switch, and also having a slip-off checking portion to prevent the operating button from slipping off through said opening, a depressing portion provided on the operating button to be abutted against a movable actuating portion of the push-button switch member, and an inclined portion provided on the operating button in crossed relation to the depressing portion and also inclined in the direction in which the push-button switch is inserted and assembled from the opening at the end face of the outer case. The device is improved in the assembling facility and the structural reliability of the assembly.

1 Claim, 6 Drawing Sheets

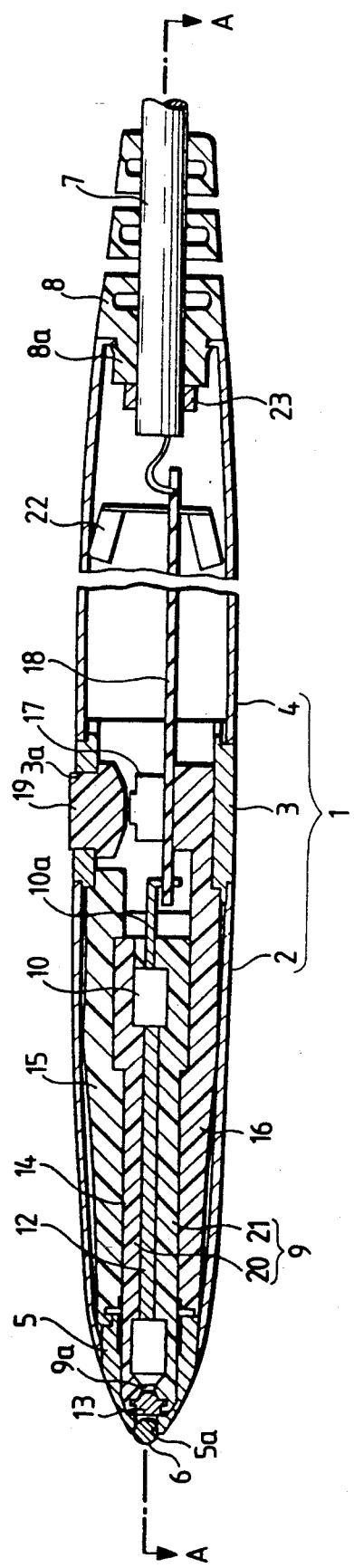
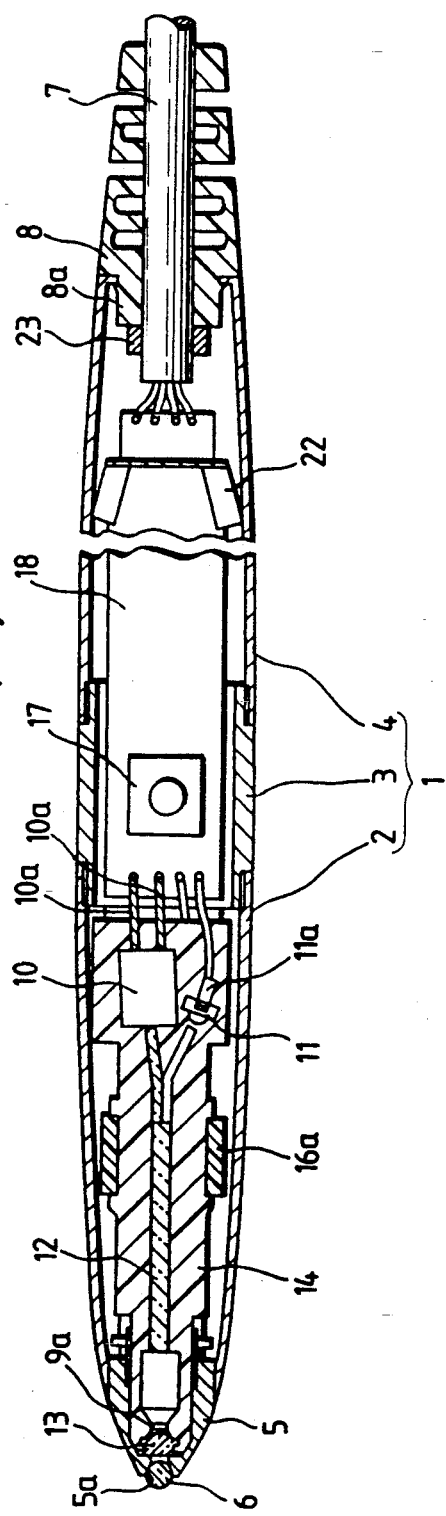
FIG. 1(a)
FIG. 1(b)

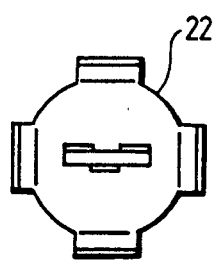
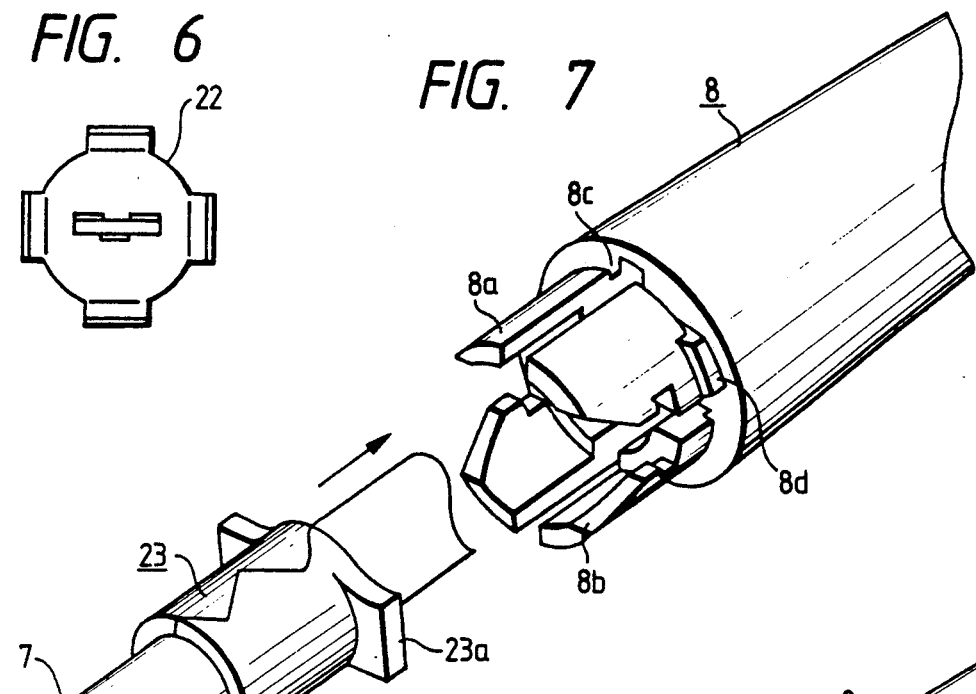
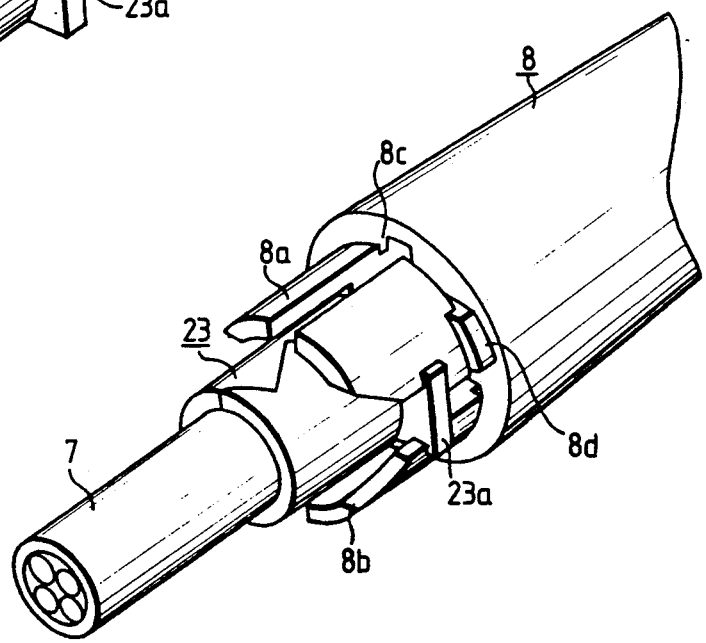
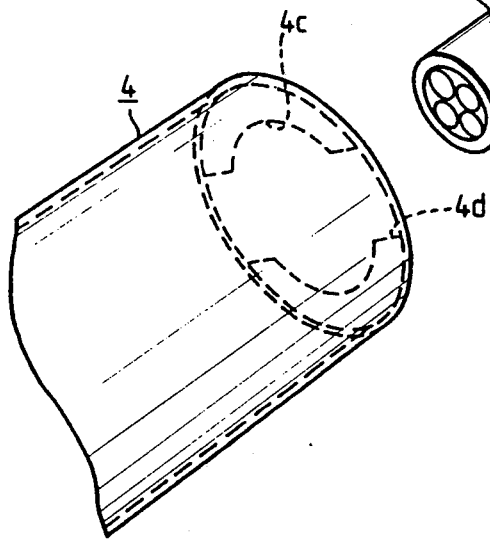

PEN TYPE OPTICAL READING DEVICE HAVING PLURAL LENS ARRANGEMENT

FIELD OF THE INVENTION

The present invention relates to a hand-held optical reading device which is gripped by an operator's hand to scan and read bar codes optically indicated on a medium, for example, and more particularly to an optical reading device which can improve the facility or easiness in assembling parts into a tubular outer case with its circumferential surface having no seams, and also the structural reliability of assembled products.

RELEVANT PRIOR ART

Such a hand-held bar code scanner is disclosed in FIG. 1 of U.S. Pat. No. 4,475,153, for example.

One conventional example of the hand-held or pen-type bar code scanner will be described below.

A pen-type bar code scanner has an approximately cylindrical outer case in which there are disposed a sensor unit incorporating a light emitting element, a light receiving element and an optical fiber, a processing circuit unit having electronic parts mounted on a circuit board, as a base, electrically connected to those light emitting and receiving elements, and the like. A cable extended from the processing circuit unit to the exterior through a bushing serves to transmit an electric signal between the scanner and main equipment. A cap covering the distal end of the outer case is formed with a window hole for reading, in which a spherical or ball lens is fitted. While pressing the spherical lens against the bar code area on a medium, light from the light emitting element is irradiated to the bar code area through the optical fiber and the spherical lens, following which the reflected light is receiving by the light receiving element through the spherical lens and the optical fiber. An electric signal from the light receiving element is processed by the processing circuit unit and then transmitted to the main equipment via a cable, so that bar code information es read.

Recently, in order to improve durability and impact-resistance of the pent-type bar code scanner, there has also been proposed a scanner having a plurality of metal-made tubular cases which are threadedly secured to each other to make up a single outer case.

In the above conventional pen-type optical reading device, where an operating button is disposed to be exposed from the barrel circumference of the outer case so that a switch may be turned on and off by depressing the operating button, the switching operability is improved to make the device more convenient in use. Also, where the outer case comprises a plurality of metal-made tubular cases, because it is advantageous for the operating button to be supported by the tubular case having an opening formed in its barrel circumference in the viewpoint of machinability, the operating button is supported by the inner wall surface at the opening peripheral edge of the tubular case beforehand when assembled, following which the circuit board mounted thereon the push-button switch to be depressed by the operating button is inserted into the tubular case. After the assembly, however, the operating button is required to be held between the tubular case and the push-button switch with play as small as possible therebetween. Accordingly, when inserting the circuit board into the tubular case, a head of the push-button switch may hit against the bottom edge of the operating button to prevent its smooth insertion. There is hense still room for improvement in the assembling facility.

Therefore, a first technical object of the present invention is to provide an optical reading device which can keepe the operating button from blocking the push-button switch and obstructing its smooth insertion during the assembly, and has the superior assembling facility.

In the above conventional pen-type optical reading device, as mentioned above, where an operating button is disposed to be exposed from the barrel circumference of the outer case so that a switch may be turned on and off by depressing the operating button, the switching operability is improved to make the device more convenient in use. With the outer case comprising a plurality of metal-made tubular cases threadedly secured to each other, however, there has been a fear that the respective tubular cases may be stepped at joints therebetween to make the actuation stroke of the operating button different button by button. More specifically, because male threads and female threads of each tubular case are required to have dimensions with some allowance in consideration of the assembling facility, a step A may be caused at joints between adjacent twos of tubular cases 2, 3 and 4 as shown in FIG. 12. This results in that the actuation stroke of an operating button 19 held between a push-button switch 17 on a circuit board 18 and the tubular case 3 having an opening 3a may become too small, or the operating button 19 may meet with excessive play as illustrated in FIG. 12. In either case, the operability is reduced significantly. Moreover, the stepped surface of the outer case deteriorates an aesthetic appearance and a feeling of fitness when the device is gripped by the hand.

Therefore, a second technical object of the present invention is to provide an optical reading device which can prevent a discrepancy at joints between adjacent twos of the plural tubular cases in a connected condition, and has stable mechanical characteristics without deteriorating an appearance and feeling in the operation.

When the outer case is made of resin, the split case structure can be employed. Accordingly, it is possible to form a bushing integrally with a cable beforehand, and then connected the cable to the circuit board before assembly of the split case parts. Meanwhile, when the outer case comprises a plurality of metal-made tubular cases in combination, a bushing is attached to the tubular case at the tail end, following which the cable is inserted through the bushing. After connecting the cable to the circuit board, a locking fixture such as a strain relief must be fitted in place to prevent the cable from slipping off from the bushing. However, the slip-off checking effect is only obtained with the arrangement that the locking fixture fitted on the cable is just abutted in the outer case against the bushing. Thus, if the cable is pushed into the outer case or twisted, undue forces might be applied to the connection point between the cable and the circuit board, thereby causing a failure in connection.

For the reason, although an optical reading device has also been proposed in which the locking fastener fitted on the cable is fixed by tightening a screw externally, this device is disadvantageous in that the number of parts is increased and the assembly becomes more troublesome.

Therefore, a third technical object of the present invention is to provide an optical reading device which can prevent a wiring member inserted through the bushing from causing a failure in connection at its connected point on account of mechanical fatigue or stress applied thereto, and also prevent a reduction in the assembling facility.

In the above conventional pen-type optical reading device, as mentioned above, where an operating button is disposed to be exposed from the barrel circumference of the outer case so that a switch may be turned on and off by depressing the operating button, the switching operability is improved to make the device more convenient in use. With the outer case comprising a plurality of metal-made tubular cases threadedly secured to each other, however, there are required means for supporting the circuit board mounting thereon the pus-botton switch to be depressed by the operating button, and means for circumferentially positioning the circuit board in the tubular case having an opening from which the operating button is to be exposed to the exterior. In other words, it is difficult for the metal-made outer case to adopt the structure of directly supporting the circuit board from the viewpoint of machinability, and the push-button switch must be positioned in match with the case opening under a condition that the tubular cases are tightly screwed to each other. This necessarily results in the more complicated structure and deterioration in the assembling facility.

Therefore, a fourth technical object of the present invention is to provide an optical reading device which needs no lengthy time in assembly works such as positioning the push-button switch mounted on the circuit board and fitting the operating button, and hence which has the excellent operability.

In the pen-type optical reading device having the outer case made of metal, a retainer member is required to be assembled separately in order to prevent the circuit board from shifting or wobbling within the outer case. As one example of solution, a resin-made support has been conventionally assembled to hold fast a part of the circuit board. However, this prior art is disadvantageous in that if the asembling facility is considered with priority, a slight gap would occur between the support and the circuit board, whereby the circuit board could not be positively prevented from wobbling, while if the assembling method is so designed as to eliminate any gap between the support and the circuit board, an impact exerted on the outer case would be directly transmitted to the circuit board. In addition, the metal-made outer case has another disadvantage that when a grounding wire connected to the circuit board is connected to a part of the outer case, this connecting work of the grounding wire is troublesome.

Therefore, a fifth technical object of the present invention is to provide an optical reading device which can simplify the structure for holding the circuit board in the tubular case and connecting the grounding wire, and hence which has the excellent operability in assembly.

In the above pen-type optical recording device, a strong force may exert on the cap through the spherical lens during the operation and, if this force is directly transmitted to a sensor unit, the distance between a light receiving element and an optical fiber is varied to produce a fear of errors in reading. The strong force exerting on the cap also accompanies such a risk that the soldered point between terminals of the light receiving element and the circuit board is subjected to undue forces, which may result in a failure of conduction.

Therefore, a sixth technical object of the present invention is to provide an optical reading device which can prevent the occurrence of reading errors and conduction failures owing to forces that are produced from a reading window during the reading operation and otherwise adversely affect the arrangement of optical paths and the electric connection, whereby the stable operation is ensured in practical use over a long period of time with the rather simple construction.

In the above pen-type optical reading device, because light from the light emitting element has been conventionally irradiated to the spherical lens in the window hole from the end face of the optical fiber without being restricted in the light flux or the sectional area of the light beam, the depth of a focus becomes shallow. As a result, when the bar code area on the medium is covered with a transparent sheet, or when the spherical lens is pressed vertically against the bar code region, for example, the probability of causing reading errors is high to such an extent as leaving room for further improvement in the reliability.

Therefore, a seventh technical object of the present invention is to provide an optical reading device which can prevent the optical relationship in position from being changed by stress that exerts on the distal end, where the reading window is formed, during the reading scan, thereby stabilizing characteristics of the detection.

SUMMARY OF THE INVENTION

To solve the above first technical problem, first technical means of the present invention is featured in comprising an outer case 1 shaped into the tubular form and having an opening 3a formed in the circumferential surface thereof and an open end formed at the end face thereof; light emitting and receiving elements 10, 11 accommodated in said outer case for detecting information optically recorded on a medium; a push-button switch 17 for instructing to start a detection operation of said light emitting and receiving elements 10, 11; an operating button 19 having an operating portion accommodated to be capable of being depressed inwardly through said opening 3a to transmit a depressing force to said push-button switch 17, and also having a slip-off checking portion to prevent said operating button 19 from slipping off through said opening 3a; a depressing portion provided on said operating button 19 to be abutted against a movable actuating portion of said push-button switch member 17; and in inclined portion 19a provided on said operating button 19 in crossed relation to said depressing portion and also inclined in the direction in which said push-button switch 17 is inserted and assembled from said open end at the end face of said outer case 1.

To solve the above second technical problem, second technical means of the present invention is featured in comprising a first case 3 shaped into the tubular form and having an opening 3a formed in the circumferential surface thereof and a screwed portion 3b formed at the end face thereof; a tubular second case 2 having a screwing portion 2a to be threadedly fixed to said screwed portion 3b of said first case 3; light emitting and receiving elements 10, 11 for detecting information optically recorded on a medium, and a circuit board 18 electrically connected to said light emitting and/or receiving element 10, 11, said light emitting and receiving elements 10, 11 and said circuit board 18 being accommodated in said second case 2 and/or said first case 3; a push-button switch 17 fixedly connected to said circuit board 18 for instructing to start a detection operation of said light emitting and receiving elements 10, 11; an operating button 19 having an operating portion accommodated to be capable of being depressed inwardly through said opening 3a to transmit a depressing force to said push-button switch 17, and also having a slip-off checking portion to prevent said operating button 19 from slipping off through said opening 3a; an operating directon and position determining member 16d accommodated in said second case 2 and said first case 3 for positioning said operating button 19 and/or said push-button switch 17 in the depressing direction between the inner wall of said first case 3 and said member 16d; and a pair of fitting portions 2b, 3d provided near said screwing portion 2a and said screwed portion 3b, respectively, and fitted to each other in a relatively rotatable manner for keeping the positional relationship between said operating button 19 and said opening 3a as established after being positioned by said operating direction and position determining member 16d.

To solve the above third technical problem, third technical means of the present invention is featured in comprising an outer case 1 shaped into the tubular form; light emitting and receiving elements 10, 11 accommodated in said outer case 1 for reading information optically recorded on a medium; a circuit board 18 electrically connected to said light emitting and/or receiving element 10, 11 and also accommodated in said outer case 1; a latching portion 4c provided to extend toward the axis of said outer case 1 at the open end of said outer case 1 opposite to the side, where said light emitting and receiving elements 10, 11 are disposed, with said circuit board 18 therebetween; a bushing 8 made of flexible material and engaging with said latching portion 4c at latched portions 8c, 8d formed on the outer circumference of said bushing 8; a wiring member 7 having flexibility and inserted through a through-hole formed along the axis of said bushing 8 for electrically connecting said outer case 1 to external equipment; a wiring terminal provided at the end of said wiring member 7 for electrical connection with said circuit board 18 within said outer case 1; a locking fixture 23 mechanically fixed to the outer circumference of said wiring member 7 at a position near said wiring terminal; an engaging portion 23a provided integrally with said locking fixture 23 and projecting toward the inner wall of said outer case 1; and an engaged portion 8b provided integrally with said bushing 8 to be engaged with said engaging portion 23a within said outer case 1 to thereby prevent said wiring member 7 from slipping off from said outer case 1 toward the exterior.

To solve the above fourth technical problem, fourth technical means of the present invention is featured in comprising a first case 3 shaped into the tubular form and having an opening 3a formed in the circumferential surface thereof; a tubular second case 2 fixedly screwed to one end of said first case 3 and having an open end in opposite relation to said screwed position; a sensor 14 accommodated in said second case 2 and at said open end thereof, and also having light emitting and receiving elements 10, 11 for detecting information optically recorded on a medium; a push-button switch 17 for instructing to start a detection operation of said sensor 14; an operating button 19 having an operating portion accommodated to be capable of being depressed inwardly through said opening 3a to transmit a depressing force to said push-button switch 17; a circuit board 18 including said push-button switch 17 fixedly connected thereto in confronting relation to a position where said operating button 19 is accommodated, and also electrically connected to at least one of said light emitting and receiving element 10, 11; and a holder 16 contacting with said circuit board 18 and said sensor 14 for positioning thereof, and also engaging with an engagement portion 3f provided in said first case 3 to position said circuit board 18 and said sensor 14 in the circumferential direction.

To solve the above fifth technical problem, fifth technical means of the present invention is featured in comprising an outer case 1 having electric conductivity and shaped into the tubular form; a circuit board 18 accommodated in said outer case 1, and light emitting and receiving elements 10, 11 electrically connected to said circuit board 18; light guiding means 6, 12, 13 disposed between said light emitting and receiving elements 10, 11 and the end of said outer case 1 for guiding light to read information optically recorded on a medium; and a holding piece 22 having electric conductivity, formed of elastic material, and also electrically and mechanically connected to the inner wall of said outer case 1 for holding fast said circuit board 18 which is supplied with a detection signal resulted from said light receiving element 11 by reading optical information led through said light guiding means 6, 12, 13.

To solve the above sixth technical problem, sixth technical means of the present invention is featured in comprising an outer case 1 shaped into the tubular form and having an open end at the end thereof; a cap 5 disposed inside the open end of said outer case 1 and formed with an optical reading window 6 for detecting information optically recorded on a medium; a sensor 14 accommodated in said outer case 2 and having light guide paths 12, 13 to optically couple between said optical reading window 6 of said cap 5 and light emitting and receiving elements 10, 11 provided on said sensor 4; a circuit board 18 accommodated in said outer case 1 and also electrically connected to said light emitting and receiving elements 10, 11 of said sensor 14; holders 15, 16 fixedly held in said outer case 1, which accomodates said circuit board 18 therein, to bear a pressing force in the axial direction of said outer case 1 that is produced when said cap 5 is brought into contact with said medium; sensor supporting portions respectively provided on said holders 15, 16 for supporting said sensor 14 in a direction perpendicular to the axial direction of said outer case 1; and engaging portions 15b, 16b respectively provided on said holders 15, 16 to be engaged with an engaged portion 5b formed in said cap 5, for preventing said pressing force exerted on said optical reading window 6 of said cap 5 from being transmitted to said sensor 14 supported by said sensor supporting portions.

To solve the above seventh technical problem, seventh technical means of the present invention is featured in comprising a tip member 5 formed with an optical reading window 6 for detecting information optically recorded on a medium; light emitting and receiving elements 10, 11 optically coupled to said optical reading window 6 of said tip member 5; a sensor case 9, 20, 21 constructed of a pair of split pieces and accommodating said light emitting and receiving elements 10, 11; an iris 9a formed by the inner wall of said sensor case 9, 20, 21 for limiting a sectional configuration through which both irradiation light from said light emitting element 10 and reflected light toward said light receiving element 11 transmit; a condensing member 13 desirably positioned along the optical axis of the light transmitting through said iris 9a; and a condensing member mounting portion 9b provided between said tip member 5 and said sensor case 9, 20, 21 for arranging said condensing member 13 at a proper position on an optical path which is defined by said optical reading window 6, said iris 9a, and said light emitting and receiving elements 10, 11.

The above first technical means operates as follows.

Specifically, even if the head portion of the push-button switch abuts against the bottom of the operating button during insertion of the circuit board, the push-button switch can move along the tapered surface of the operating button and can be smoothly inserted without any obstruction.

The above second technical means operates as follows.

Specifically, the pair of adjacent cases are provided with threadedly mating portions and stepped portions located near the former for rotatably fitting to each other, respectively. By controlling dimensions of those stepped portions and the respective portions of the pair of adjacent cases into a limited range, a step produced at a joint between the pair of adjacent cases is minimized.

The above first technical means operates as follows.

Specifically, by attaching a locking fixture to the cable inserted through the bushing and then pulling the cable in the withdrawing direction, the locking fixture is inserted and fixed in the engagement portion of the bushing. In addition, the bushing is previously mounted to the rear end of the outer case in such a manner as to prevent a rotation of the bushing. As a result, no forces tending to withdraw or twist the bushing are transmitted to the cable in the outer case externally, whereby the connection point between the cable and the circuit board is positively protected.

The above fourth technical means operates as follows.

Specifically, the holders for positioning and supporting the circuit board support are assembled to be prevented from rotating with respect to one tubular case. In assembly, therefore, by combining the holders with that one tubular case, the positional relationship among the operating button, the opening formed in that one tubular case to accomodate the operating button and the push-button switch is automatically set to a proper one.

The above fifth technical means operates as follows.

Specifically, simply by inserting the circui board, having the metal piece attached thereto, into the outer case, works of positioning and grounding the circuit board is automatically effected.

The above sixth technical means operates as follows.

Specifically, since the external force is borne by the holders and then the outer case, the position of the sensor in the circumferential direction and the connecting position of the circuit board will not be changed by the external force. As a result, reading characteristics is maintained stable over time.

The above seventh technical means operates as follows.

Specifically, light emitted from the light emitting element is irradiated to the medium after passing through the iris and the plano-convex lens and, from the medium to wich the restricted beam of light is thus irradiated, reflected light enters the optical reading window in such a narrow range as increasing the reading resolution. Therefore, even when the spacings between indicated marks such as bar codes are small, the reading operation can be performed accurately.

BRIEF DESCRIPTION OF THE DRAWINGS

FIG. 1(a) is a sectional view showing an optical reading device;

FIG. 1(b) is a sectional view taken along a line A—A in FIG. 1(a);

FIG. 6 is a plan view of an elastic metal piece in FIG. 1(a), as viewed in the direction of a reading window;

FIG. 7 is an exploded perspective view of important components for explaining the step of fitting a cable, which has a strain relief fixed thereto in FIG. 1(a), into a bushing;

FIG. 8 is an exploded perspective view of the important components for explaining a condition after the fitting step of FIG. 7 has been completed;

DETAILED DESCRIPTION OF PREFERRED EMBODIMENT

Hereinafter, a preferred embodiment of an optical reading device of the present invention having the respective first through seventh technical means will be described in detail with reference to FIGS. 1–11.

Figure 2:
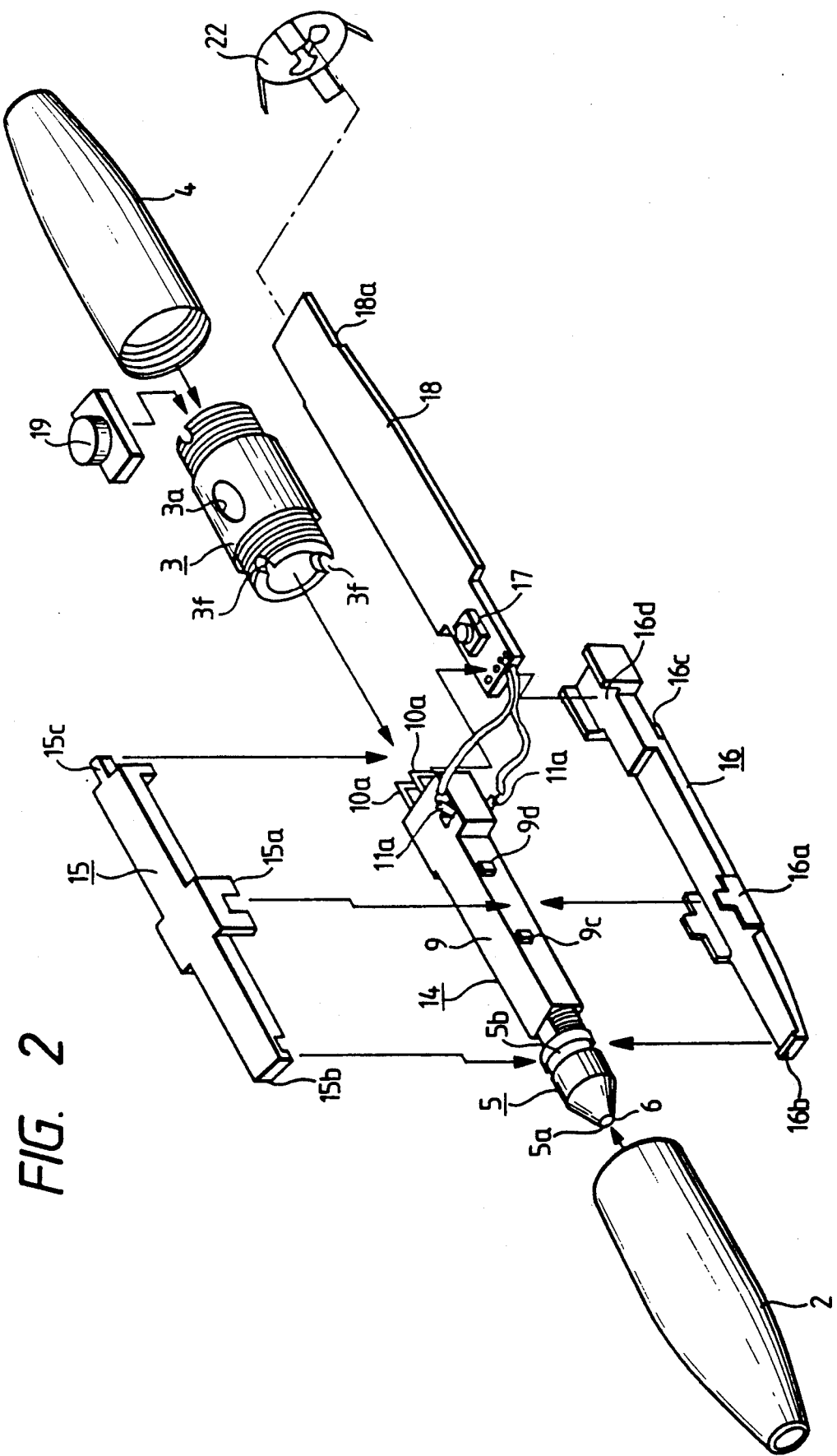
FIG. 2 is an exploded perspective view showing important components of the device in FIGS. 1(a) and 1(b)

A pen-type bar code scanner shown in those drawings has a housing which comprises a metal-made outer case 1 constructed of three tubular cases 2, 3, 4 threadedly secured to each other, and a cap 5 covering the distal end of the outer case 1, as will be seen from the sectional views of FIGS. 1(a) and 1(b) and the exploded perspective view of FIG. 2. A spherical lens 6 made of a ruby or the like is fitted in a window hole 5a formed at the tip end of the cap 5, and a bushing 8 through which a cable 7 to be led to the exterior penetrates is attached to the rear end of the outer case 1. Within the outer case 1, there are disposed a sensor unit 14 comprising a light emitting element 10, a light receiving element 11, an optical fiber 12, a plano-convex lens 10, etc. all of which are accommodated in a sensor case 9 of the split structure, a pair of holders 15, 16 for holding the sensor unit 14 in place, a circuit board 18 which has electronic components such as a push-button switch 17 mounted thereon and is electrically connected to the light emitting and receiving elements 10, 11 and the cable 7, as well as an operating button 19 disposed on the push-button switch 17 to be exposed from or located in an opening 3a formed in the barrel circumference of the tubular case 3. The circuit board 18 and the electronic components mounted thereon jointly make up a processing circuit unit for the bar code scanner.

In this bar code scanner, while pressing the spherical lens 6 against a bar code area on an external medium (not shown), light from the light emitting element 10 is irradiated to the bar code area through the optical fiber 12, the plano-convex lens 13 and the spherical lens 6, following which the reflected light is received by the light receiving element 11 through the spherical lens 6, the plano-convex lens 13 and the optical fiber 12. An electric signal from the light receiving element 11 is processed by the processing circuit unit and then transmitted to main equipment via the cable 7, so that the bar code information is read.

Respective components of the bar code scanner will be described below in more detail.

Figure 3:
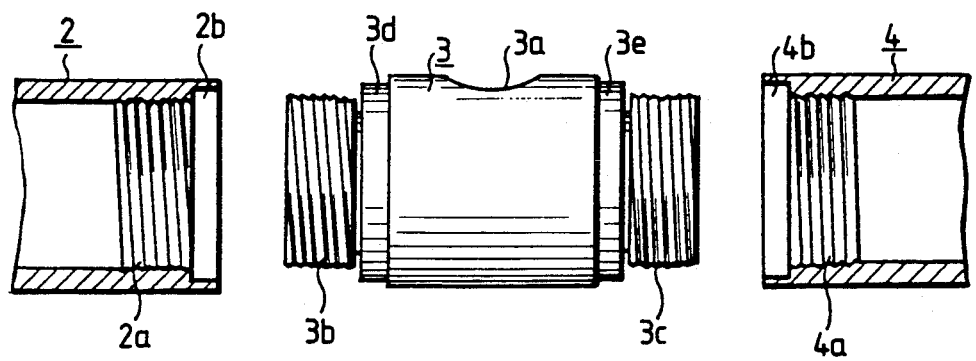
FIG. 3 is an exploded sectional view showing joints of an outer case in FIG. 1(a)
Figure 4:
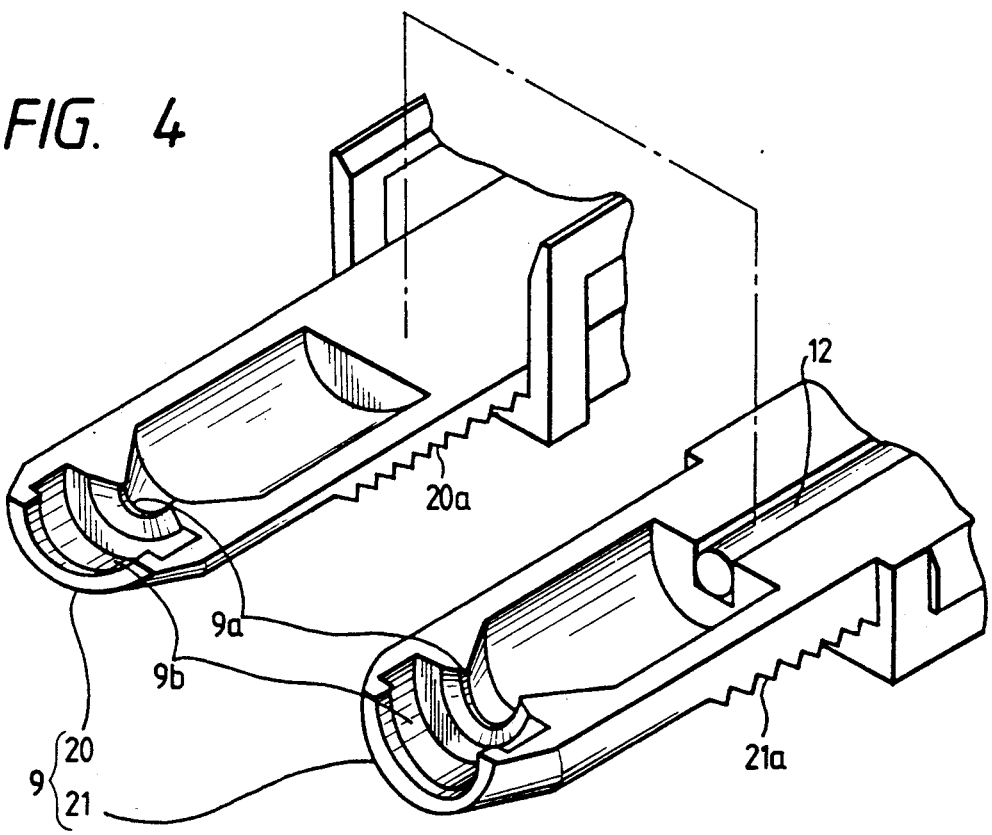
FIG. 4 is an exploded perspective view showing the principal structure of a sensor case in FIG. 1(a)

The metal-made outer case 1 is made up by screwing or engaging a female thread portion 2a of the front tubular case 2 on or with a male thread portion 3b of the intermediate tubular case 3 on one side, and also screwing a female thread portion 4a of the rear tubular case 4 on a male thread portion 3c of the intermediate tubular case 3 on the other side. At this time, the male and female thread portions screwing to each other are required to have their dimensions with some allowance in consideration of the assembling facility. In order to prevent a step from being produced at joints between the tubular cases depending on differences in the individual screwed conditions, as shown in FIG. 3, a pair of concave support portion 2b and convex support portion 3d are provided near the female thread portion 2a and the male thread portion 3b at corresponding positions, respectively, and a pair of concave support portion 4b and convex support portion 3e are provided near the female thread portion 4a and the male thread portion 4b at corresponding positions, respectively. Specifically, the inner diameter of the concave support portion 2b and the outer diameter of the convex support portion 3d are set substantially equal to each other, and the inner wall surface of the former is fitted over the outer wall surface of the latter in a relatively rotatable manner. This enables it to eliminate or minimize the step which is otherwise produced at the joints between the tubular cases 2 and 3 when the female thread portion 2a and the male thread portion 3b are screwed to each other. Likewise, by fitting the inner wall surface of the concave support portion 4b over the outer wall surface of the convex support portion 3e in a relatively rotatable manner, it is possible to eliminate or minimize the step which is otherwise produced at the joints between the tubular cases 3 and 4.

A pair of locking slots 3f (see FIG. 2) for positioning and supporting holders 15, 16 (described later), respectively, are provided at the distal end periphery of the intermediate tubular case 3 having the opening 3a from which the operating button 19 is exposed. Each pair of latching pieces 4c and cut-outs 4d (see FIG. 8) for locking the bushing 8 are provided at the rear of the rear tubular case 4 to which the bushing 8 is attached.

The sensor case 9 of the sensor unit 14 comprises a pair of resin-made split pieces 20, 21 combined with each other. In the sensor case 9, there are accommodated and held the light emitting and receiving elements 10, 11 in the rear portion thereof, and the optical fiber 12 as light guide means in front of the light emitting and receiving elements 10, 11. In the front portion of the sensor case 9, as will be seen from the exploded perspective view of FIG. 4, there is defined an iris or stop 9a of the rather small diameter surrounded by the inner wall surface of the paired split pieces 20, 21 at a position confronting the distal end of the optical fiber 12. Forwardly of the iris 9a, a lens mounting recess 9b for accommodating and holding the plano-convex lens 13 is also defined by the inner wall surfaces of the paired split pieces 20, 21. Then, thread grooves 20a, 21a having respective pitches in match with each other are engraved on the corresponding outer wall surfaces of the paired split pieces 20, 21 in their front portions, and the cap 5 is fixedly screwed on the sensor case 9 by using the thread grooves 20a, 21a. As a result, an aperture (i.e., the diameter) of the iris 9a can be set to a predetermined value, and the plano-convex lens 13 can be positively held and fixed between the inner surface 5c of the cap 5 and the lens mounting recess 9b (see FIG. 10). The above arrangement can also determine the positional relationship among the iris 9a, the plano-convex lens 13 and the spherical lens 6 as intended.

As shown in FIGS. 1 and 2, the pair of resin-made upper and lower holders 15, 16 loosely sandwich the sensor unit 14 in a state that their fitting portions 15a, 16a having the complementary shapes are fitted with each other between ribs 9c and 9d on the sensor case 9, and hook-like lugs 15b, 15b protruding from the distal ends of the holders 15, 16 are engaged in a groove 5b formed around the cap 5. Also, projections 15c, 16c are projecting from the rear ends of the holders 15, 16 and engaged in the corresponding locking slots 3f of the tubular case 3, whereby the holders 15, 16 are positioned and held by the tubular case 3. Moreover, an extension 16d extending from the rear end of the lower tubular case 16 serves to position and support the distal end portion of the circuit board 18. In assembly, respective terminals 10a, 11a of the light emitting element 10 and the light receiving element 11 are first soldered to the circuit board 18, and the holders 15, 16 are combined together with the hook-like lugs 15b, 16b at their distal ends being engaged with the cap 5. Afterward, the rear ends of the holders 15, 16 are engaged with the tubular case 3, followed by screwing the tubular case 2 to the tublar case 3 from the side of the cap 5.

Figure 5:
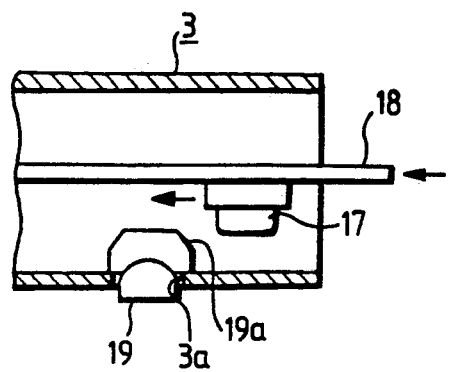
FIG. 5 is a fragmentary sectional view showing the step assembling an operating button in FIG. 1(a)

On the circuit board 18 as a base of the processing circuit unit, there is mounted the push-button switch 17 over which the operating button 19 is placed. By depressing the operating button 19, the push-button switch 17 is turned on and off. The operating button 19 is formed in its bottom edge with a tapered or chamfered surface 19a gradually narrowing toward the push-button switch 17 in such a manner as not to obstruct the assembly. More specifically, in the assembly, the circuit board 18 mounting the push-button switch 17 thereon is inserted through the tubular case 3, while holding the operating button 19 by the inner wall surface at the peripheral edge of the opening 3a in the tubular case 3 which is set upside down, as shown in FIG. 5. At this time, even if the push-button switch 17 abuts at its head against the bottom of the operating button 19, the switch head can pass over the bottom edge by being guided along the tapered surface 19a, whereby the button bottom is kept from preventing smooth insertion of the switch head.

Further, an elastic metal piece 22 as shown in FIG. 6 is inserted over the circuit board 18 from its rear end.

The elastic metal piece 22 is brought into abutment against stepped portions 18a of the circuit board 18 and soldered to patterns on the circuit board 18, so that the elastic metal piece 22 and the circuit board 18 are electrically and mechanically connected to each other. In the assembly, therefore, when the rear tubular case 4 is screwed to the intermediate tubular case 3, i.e., as the circuit board 18 is inserted into the rear tubular case 4, the elastic metal piece 22 comes into elastic contact with the inner wall surface of the rear tubular case 4, and the rear end portion of the circuit board 18 is held fast by the rear tubular case 4 via the elastic metal piece 22. Note that before inserting the circuit board 18 into the rear tubular case 4, the cable 7 to be led to the exterior is connected to the circuit board 18.

Figure 9A:
FIGS. 9(a)–9(e) are views for explaining an assembly sequence of fitting the cable in FIG. 1(a) in the form of successive steps.
Figure 9B:
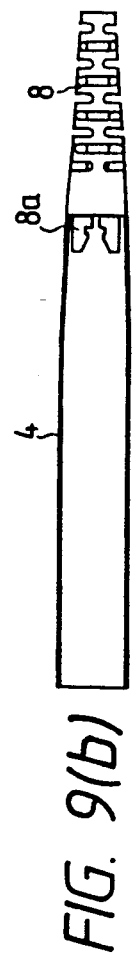
Figure 9C:
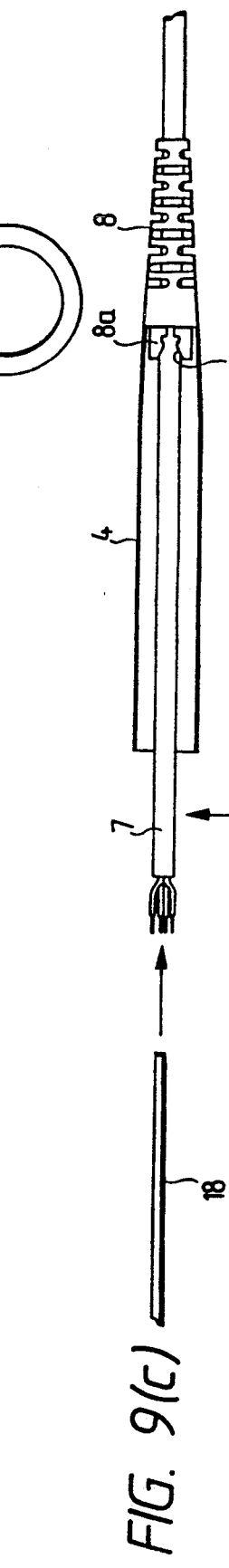
Figure 9D:
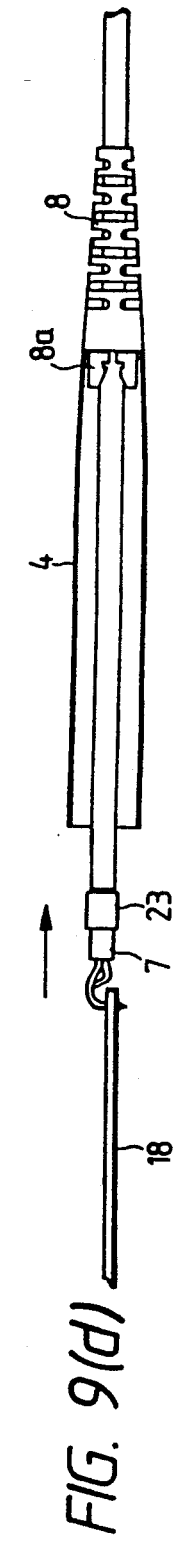
Figure 9E:
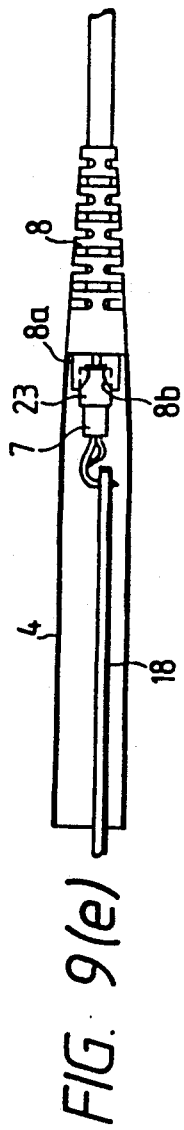
Figure 10:
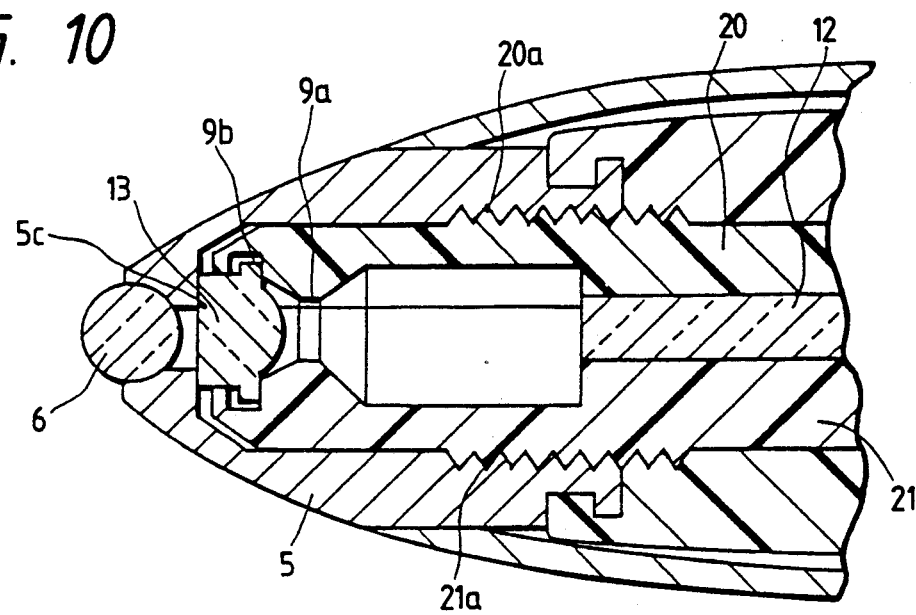
FIG. 10 is an enlarged sectional view of important components showing the vicinity of an optical window in FIG. 1(a)

At the distal end of the bushing 8, as shown in FIG. 7, there is projected a flexible engagement portion 8a of the split structure with engagement slots 8b being formed therein. By fitting engagement lugs 23a of a strain relief 23 attached to the cable 7 into the corresponding engagement slots 8a under pressure, the strain relief 23 is inserted and fixed in the engagement portion 8a. At the base end of the engagement portion 8a, there are formed grooves 8c into which the latching pieces 4c of the tubular case 4 as shown in FIG. 8 are fitted, and anti-rotation bosses 8d which are loosely fitted in the cut-outs 4d of the tubular case 4. Accordingly, in the assembly, the bushing 8 is first press-fitted into the rear end of the tubular case 4 so that these two components are combined together, as shown in FIG. 9(a). Then, the cable 7 is inserted through the bushing 8 as shown in FIG. 9(b). Afterward, as shown in FIG. 9(c), the strain relief 23 is attached to the cable 7 electrically connected to the circuit board 18. Then, by pulling the cable 7 in the withdrawing direction as shown in FIGS. 9(d) and 7, the engagement lugs 23a are press-fitted into the engagement slots 8b and the strain relief 23 is inserted and fixed in the engagement portion 8a. Eventually, after completion of the assembly, the strain relief 23 attached to the cable 7 is combined integrally with the tubular case 4 through the bushing 8.

In this embodiment, as described above, since the support portions 2b, 3d and 3e, 4b fitting to each other in a relatively rotatable manner are provided in the adjacent joint parts of the tubular cases 2, 3 and 3, 4, respectively, besides the male and female thread portions, it is possible to prevent the occurrence of a step at the joint between adjacent twos of the tubular cases 2, 3 and 4 due to screwed conditions thereof, by setting tolerance in the mutual fitting of the support portions to a limited range. Therefore, the actuation stroke of the operating button 19, which is otherwise varied depending on different steps, becomes uniform to ensure the good operability. The unnoticeable presence of the step also contributes to provide an attractive appearance.

In the above embodiment, since the light emitted from the light emitting element 10 is restricted by passing through the iris 9a and the plano-convex lens 13, and the beam of light thus restricted is irradiated to the bar code area on the medium, the depth of a focus is increased to ensure the accurate reading regardless of whether the distance between the spherical lens 6 and the bar code area is small or large. In addition, since the sensor case 9 in which the iris 9a and the lens mounting recess 9b are defined has the split structure, the light emitting and receiving elements 10, 11, the optical fiber 12, the plano-convex lens 13, etc. can be easily assembled and the iris diameter can be set to a desired value.

In the above embodiment, the sensor unit 14 is held between the pair of upper and lower holders 15, 16 and the both ends of these holders 15, 16 are engaged with the cap 5 and the intermediate tubular case 3. Therefore, even if a strong force is applied to the cap 5 through the spherical lens 6 during the operation, the force is transmitted to the tubular case 3 via the holders 15, 16 to thereby protect the sensor unit 14. Consequently, reading errors and conduction failures on account of external forces can be avoided.

Furthermore, the holders 15, 16 are engaged with the tubular case 3 in such a manner as to prevent an unintentional rotation, while positioning and supporting the circuit board 18. In the assembly, therefore, by combining the holders 15, 16 and the tubular case 3 with each other, the positional relationship between the tubular case 3 and the circuit board 18 is automatically determined, making it possible to simply and reliably position the opening 3a and the push-button switch 17 relative to each other.

In the above embodiment, since the tapered surface 19a gradually narrowing toward the bottom end is formed at the bottom edge of the operating button 19 so that the bottom of the operating button 19 will not block the head of the push-button switch 17 and obstruct its smooth insertion during the assembly, the assembling facility is increased and the operating button 19 is prevented from wobbling due to play as far as possible after the assembly.

In the above embodiment, as the circuit board 18 having the elastic metal piece 22 is inserted into the rear tubular case 4, the elastic metal piece 22 comes into elastic contact with the inner wall surface of the tubular case 4, so that the rear portion of the circuit board 18 is held fast and the circuit board 18 is grounded via the elastic metal piece 22. This eliminates the need of separately assembling a grounding wire or the like, with the result that the number of necessary parts is reduced, the assembling facility is improved, and further the resistance of the circuit board 18 against an impact is enhanced.

In the above embodiment, after attaching the strain relief 23 to the cable 7 which has been inserted through the bushing 8, the strain relief 23 can be inserted and fixed in the engagement portion of the bushing 8 simply by pulling the cable 7 in the withdrawing direction. Moreover, since the bushing 8 is previously press-fitted to the rear end of the tubular case 4, the cable 7 within the outer case 1 can be neither pushed and pulled not twisted externally. Accordingly, the connection point between the cable 7 and the circuit board 18 can be protected with the reduced number of parts and without deteriorating the assembling facility.

In place of tapering the bottom of the operating button 19, the head of the push-button switch 17 may be shaped into the tapered form gradually narrowing toward the top face, or both the head of the push-button switch 17 and the bottom of the operating button 19 may be shaped into the tapered form narrowing toward the top and bottom end, respectively.

Note that the locking structure of the bushing 8 and the tubular case 4, the split configuration of the engagement portion 8a of the bushing 8, etc. are not limited to those employed in the above embodiment and may be modified as required.

It is also needless to say that the engagement structure between the tubular case 3 having the opening 3a and the holders 15, 16 may be optionally modified other than that employed in the above embodiment.

Figure 11A:
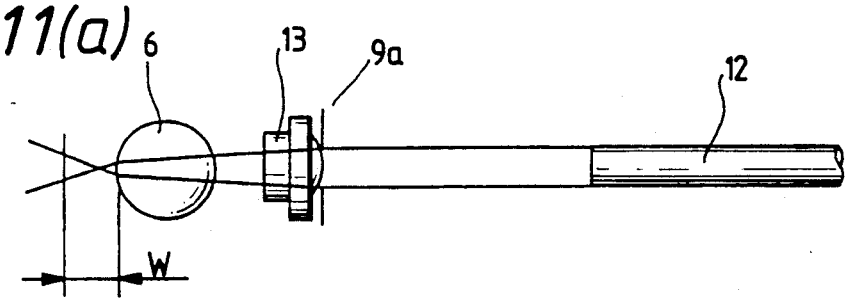
FIGS. 11(a) and 11(b) are conceptual views showing arrangements of an optical system, for explaining characteristics of the detection in FIG. 1(a)
Figure 11B:
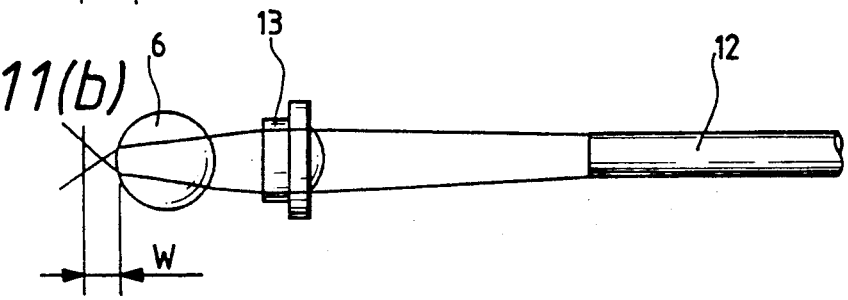
Figure 12:
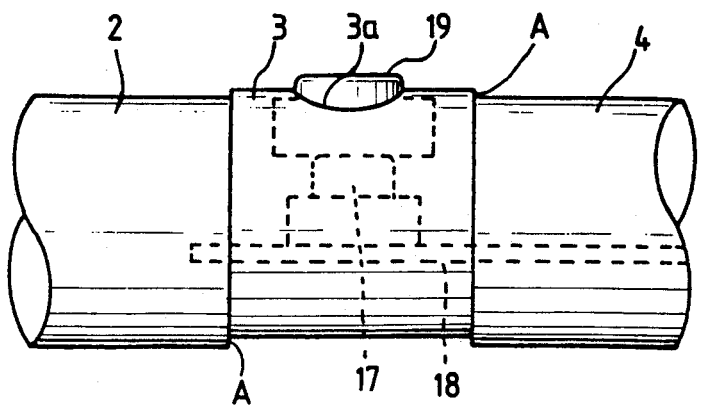
FIG. 12 is a fragmentary side view for explaining a disadvantage of an optical reading device in the prior art.

Because the optical reading device of that type is gripped by the operator's hand when used for the reading operation, as mentioned before, the device must positively read bar codes even from above a laminate sheet and even at a large inclination. In view of this, this embodiment is arranged to determine the positional relationship among the three components; i.e., the iris 9a, the plano-convex lens 13 and the spherical lens 6, as explained above. Specifically, an optical reading device may have optical systems as shown in FIGS. 11(a) and 11(b). FIG. 11(a) is an explanatory view showing the optical system of this embodiment, whereas FIG. 11(b) is an explanatory view showing the optical system, which includes no iris, for the purpose of comparison.

In the case of the optical system having no iris shown in FIG. 11(b), the light intensity (output power) is obtained sufficiently, but the depth of a focus W is small. Thus, the range in which bar codes can be read is narrow.

Meanwhile, in the case of this embodiment (having the iris) shown in FIG. 11(a), the diameter of the iris 9a is reduced to provide the light intensity as low as necessary. With this arrangement, although the light intensity becomes smaller than that in the case of FIG. 11(b), a change in the output power with respect to a change in the distance from the tip end of the spherical lens 6 to the bar code area is reduced and, eventually, the readable range is increased. Further, while the depth of a focus W is usually varied depending on the size and position of the iris, the size and position of the iris 9a can be set constant with respect to the plano-convex lens 13 and, therefore, the depth of a focus W can also be set constant in this embodiment.

With the above arrangement, it is further possible not only to align the optical axes of the window hole 5a, the iris 9a formed in the sensor case 9 and other light guide paths between the cap 5 and the sensor case 9 with one another, but also to accurately locate the axial positions of the respective components on the optical axes.

In this connection, if the aperture of the iris 9a (i.e., the iris diameter) of the sensor case 9 is made too small, the light intensity might be insufficient. It is hence desired that the iris diameter be in consideration balance between the light intensity and the depth of a focus.

It is also to be noted that the structure of fitting the holders 15, 16 to each other, the structure of engaging the holders 15, 16 with the outer case 1 and the cap 5, etc. are not limited to those employed in the above embodiment and may be modified as required.

The present invention can provide various advantages as follows.

According to the optical reading device of the present invention having the above-mentioned first technical means, even if the operated portion given by the head of the push-button switch abuts against the bottom of the operating button during the assembly, there is no possibility that the bottom edge will obstruct smooth insertion of the switch head and the inserting and assembling work will become difficult to carry out. This results in such an improvement in the assembling work as that the circuit board mounting the push-button switch thereon can be smoothly inserted and arranged in the proper position. In addition, since there is not need of leaving en extra clearance by reducing the standard dimension of the operating button, for example, in consideration the operating facility, the wobbling movement of the operating button due to play after the assembly is minimized.

According to the optical reading device of the present invention having the above-mentioned second technical means, the pair of tubular support portions fitting to each other in a relatively rotatable manner and having their controlled dimensions are provided near the thread portion (e.g., the male thread portion in the embodiment) of one tubular case and near the thread portion (e.g., the female thread portion in the embodiment) of the other tubular case, respectively, these two tubular cases being threadedly secured to each other. It is therefore possible to eliminate the occurrence of an unfavorable step, assembly play of the like at the joints between each pair of the tubular cases, reduce variations in the actuation stroke of the operating button caused by that unfavorable step, and also to present a product which is excellent in an appearance of the entire product and feeling perceived when the device is gripped by the operator's hand.

According to the optical reading device of the present invention having the above-mentioned third technical means, since the cable including a slip-off checking fixture attached thereto is inserted through the bushing mounted to the rear end of the outer case in such a manner as to prevent both rotation and slip-off thereof, and the slipoff checking fixture is fitted to the flexible engagement portion of the bushing mounted in the outer case, the cable can be prevented from being withdrawn, pushed or twisted, with the reduced number of parts and the simpler construction. It is therefore possible to protect the electrical connection points within the outer case, and also to provide a product which is highly reliable over time and has the superior assembling facility.

According to the optical reading device of the present invention having the above-mentioned fourth technical means, since the position relationship between the holders for positioning and holding the circuit board and the opening formed in the tubular case and receiving the operating button is automatically determined in the assembly, it takes no lengthy time to align the actuating directions of the operating button and the push-button switch with each other. It is therefore possible to provide a product which can complete accurate positioning with the simpler construction simply by inserting the circuit board and the holders into the outer case, and has the superior assembling facility.

According to the optical reading device of the present invention having the above-mentioned fifth technical means, since the metal piece attached to the circuit board comes into elastic contact with the inner wall surface of the outer case for thereby holding fast the circuit board in a mechanical manner and ground-connecting the outer case to the circuit board, there are no needs of separately providing a lead wire for the grounding and also connecting the lead wire by screwing or the like. It is therefore possible to provide a product which can reduce the number of parts, only requires to the circuit board having the metal piece electrically connected and mechanically fixed thereto into the outer case in the assembly, and further can increase resistance of the circuit board against an impact.

According to the optical reading device of the present invention having the above-mentioned sixth technical means, since the pair of the holders holding a reflection-type sensor is engaged with both the cap and the outer case, the force exerted on the cap during the reading scan is transmitted not to internal components such as the sensor and the circuit board, but via the holders to the outer case which is being gripped by the hand and subjected to an operating force. It is therefore possible to provide the device which is electrically stable, has small optical fluctuations and exhibits the high product reliability with the very rare occurrence of detection errors or conduction failures.

According to the optical reading device of the present invention having the above-mentioned seventh technical means, since the light emitting element and the light receiving element are accommodated in the sensor case comprising a pair of split pieces, the iris is formed in the sensor case, and further the plano-convex lens is positioned by a tip member having an optical reading window formed therein and the sensor case, the depth of a focus is so increased as to avoid the occurrence of reading errors, and the plano-convex lens can be assembled while being held by the sensor case. It is therefore possible to provide a product which has the superior assembling facility, and is also good and stable in the quality.

What is claimed is:

1. An optical reading device comprising:
   an elongated sensor case (9, 20, 21) containing a light emitting element (10) and a light receiving element (11) and defining a light path along an optical axis of said sensor case (9, 20, 21), said sensor case (9, 20, 21) defining an iris (9a) along said optical axis and adjacent an end of said sensor case (9, 20, 21), and said sensor (9, 20, 21) having a light condensing member disposed adjacent said end such that said light condensing member focuses light through said (9a) to said light path;
   a cap (5) rigidly connected to said sensor case (9, 20, 21) such that said end is disposed in an interior portion of said cap (5), said cap (5) having an interior surface adjacent said light condensing member and defining a window hole (5a) through a tip portion of said cap (5) to said interior surface, said cap (5) further having a window lens (6) disposed to focus light at a fixed distance through said window (5a) into said interior portion;
   said sensor case (9, 20, 21) defines a condensing member mounting groove (9b) located adjacent said end;
   said interior surface of said cap (5) is perpendicular to said optical axis; and
   said light condensing member comprises:
     a flat surface which abuts said interior surface of said cap (5) when said cap (5) is rigidly connected to said sensor case (9, 20, 21);
     a curved surface portion formed on a side opposing said flat surface, and
     a flanged portion provided between said curved surface portion and said flat surface portion to be accommodated in and held by said condensing member mounting groove (9b);
   wherein said cap (5) is rigidly connected to said sensor case (9, 20, 21) such that said interior surface abuts said light condensing member and said window lens (6) focuses light on said light condensing member.

* * * * *

UNITED STATES PATENT AND TRADEMARK OFFICE
CERTIFICATE OF CORRECTION

PATENT NO. : 5,162,640

DATED : November 10, 1992

INVENTOR(S) : Ishikawa

It is certified that error appears in the above-identified patent and that said Letters Patent is hereby corrected as shown below:

Col. 16, line 2:

After "said" and before "(9a)" insert —iris—.

Signed and Sealed this

Twelfth Day of October, 1993

Attest:

BRUCE LEHMAN

Attesting Officer

Commissioner of Patents and Trademarks